United States Patent Office 2,816,460
Patented Dec. 17, 1957

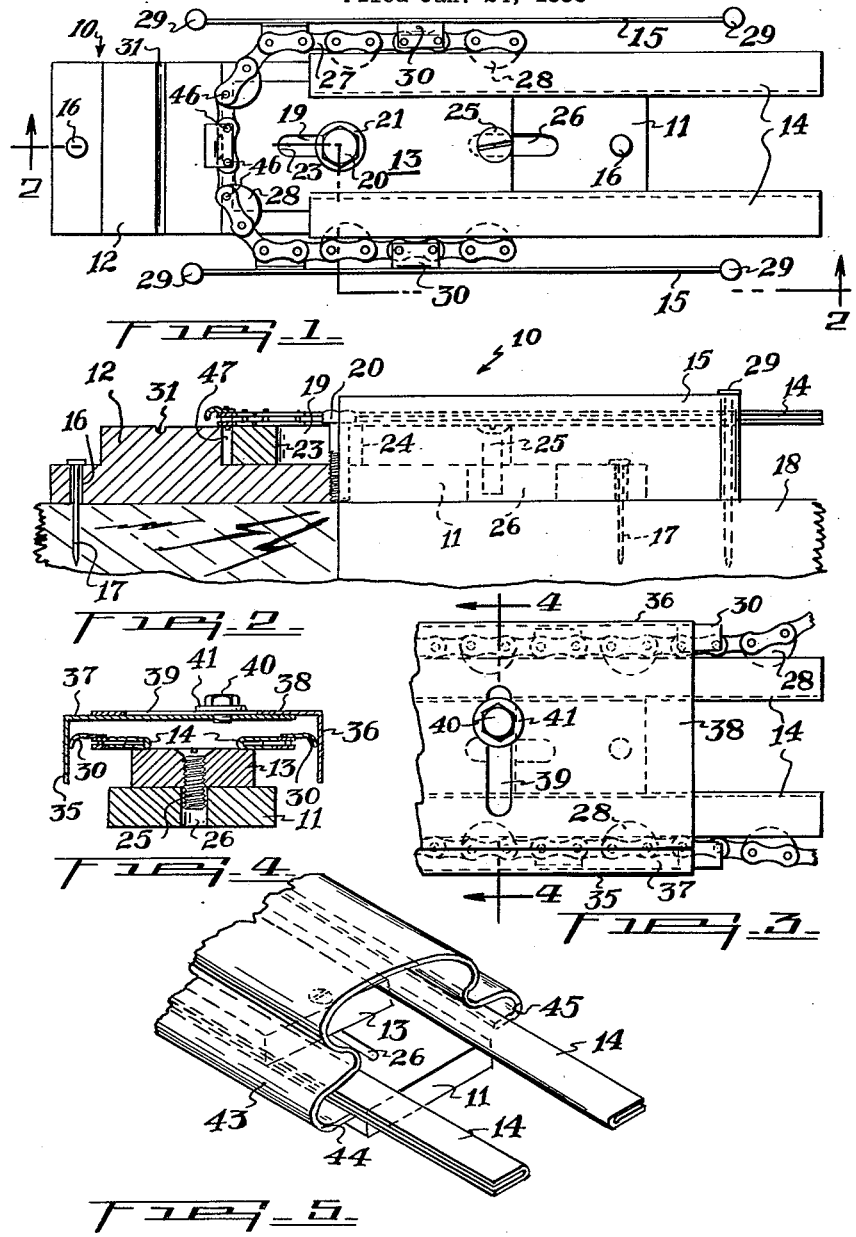

2,816,460

RETOOTHING TOOL FOR CHAIN SAWS

Reinholt Knopp, Malakwa, British Columbia, Canada

Application January 24, 1956, Serial No. 561,103

12 Claims. (Cl. 76—25)

This invention relates to retoothing tools for chain saws.

It is an object of the present invention to provide a tool which is simple and effective in operation and simple to manufacture.

According to the present invention, a device for repairing a chain saw is provided which comprises in combination a bed plate having a raised anvil element on one end of the bed plate and a sliding member adapted to slide on the bed plate towards and away from the anvil element, means being provided to lock the sliding member in any desired position relative to the anvil element, chain guide means on the sliding element and chain retaining means being provided to engage the chain and retain it in position in the chain guide means while the device is in use.

A feature of the invention is to provide means for preventing lateral movement of the sliding member relative to the base plate.

The following is a description by way of example of certain constructions in accordance with the invention, reference being made to the accompanying drawings, in which:

Figure 1 is a plan view of the tool;

Figure 2 is a part sectional side elevation taken on the lines 2—2 of Figure 1 and looking in the direction of the arrows;

Figure 3 is a part plan view of the tool showing an alternative form of chain retaining means;

Figure 4 is a sectional end elevation on the lines 4—4 of Figure 3 looking in the direction of the arrows; and Figure 5 is a perspective part end view showing a further alternative for the chain retaining means, the chain itself being omitted for the sake of clarity.

Referring to Figures 1 and 2, 10 designates generally a tool for retoothing chain saw blades. The tool comprises a base plate 11, an anvil 12, a sliding member 13 adapted to slide on the upper surface of the base plate 11, chain guide means 14 on the sliding member 13 and means 15 for retaining the chain in the guides 14. The base plate 11 is provided with holes 16 through which fasteners 17 may be passed to attach the base plate 11 to a suitable base 18, for example, a tree trunk, wooden block, or the like.

The sliding member 13 is mounted on the base plate 11 for sliding movement thereon towards and away from the anvil 12. A longitudinal slot 19 is provided in the sliding member, the ends 23, 24 of the slot abutting against a set bolt 20 when the sliding member is moved and act as stops to limit the movement of the sliding member 13 on the base-plate 11. The set bolt 20 is screw-threaded in the base-plate 11 and provided with a washer 21 which bears on the upper surface of the sliding member 13 and serves to lock the sliding member to the base-plate 11.

On the end remote from the anvil there is provided a countersunk screw 25, the shank of which depends downwardly from the underside of the sliding member and engages in a slot 26 in the base plate. The screw 25 and slot 26 serves as locating means for the sliding member and prevents lateral movement across the base plate which would cause the sliding member 13 to be misaligned relative to the base-plate. The locating effect could of course be achieved by a projection or projections in the form of a lip or lips beneath the sliding member 13 which engage shallow channel-shaped grooves in the upper surface of the base-plate 11.

On the upper surface of the sliding member at the outside edges thereof chain guide means are located in the form of two rearwardly extending chain guide members 14 which extend clear of the sliding member on the base-plate. The chain guide members are made from sheet metal and are channel-shaped in cross section. The usual guide elements 28 on the links of a chain saw 27 run within the top and bottom flanges of the channel-shaped guide members 14 and are retained therein by retaining means which in Figures 1 and 2 are in the form of metal shields 15 which extend longitudinally of the base-plate in spaced relationship thereto, and may be held in position on the wooden base 18 by fasteners 29. The shields 15 are spaced so that when the chain is carried in the chain guide members 14, the inner faces of the shields 15 contact the saw chain teeth 30 and serve to maintain the chain guide elements 28 between the flanges of the chain guide members 14.

Preferably the anvil is provided with a slot 31 which is used in the chain repairing operation as hereinafter described.

Figures 2 and 3 show an alternative type of chain retaining means which replaces the shields 15 of Figures 1 and 2. This type of chain retaining means comprise a pair of L-shaped elements 35, 36 which are crossed at their webs 37, 38, so as to form a substantially U-shaped member, the web 38 of the member 36 being provided with a slot 39 and the members 35, 36 being held together by a bolt 40, screw-threaded into a hole in the web 37. The nut 40 is provided with a washer 41 which extends over the side of the slot 39 and bears against the web 38 so as to lock the members 35, 36 together. By slackening the nut 40 and sliding the members 35, 36 apart, or together, the distance between the flanges can be adjusted. The retaining means may be attached by a set screw or the like to the sliding member 13 if it is so desired.

Figure 5 shows a second alternative construction of the chain retaining means, the chain not being in position in the guides 14 in this figure. In this construction, the chain retaining member comprises a spring steel element 43 which is provided with flanges 44, 45 adapted to bear against the teeth 30 of the chain saw and urge the guide elements 28 into the guide member 14, the element 43 is so shaped that the flanges 44, 45 are urged towards each other by the spring action of the element.

In operation, the sliding member 13 is adjusted relative to the anvil 12 so that a link of the chain saw can rest on and between the anvil 12 and the sliding member 13 with the chain rivets 46 positioned over the gap 47 between the anvil 12 and the sliding member 13. The chain to be repaired is inserted into the guide means 14, the chain retaining means adjusted so as to retain the chain within the guide members 14, and the link to be repaired is positioned between the anvil 12 and the sliding member 13 in the manner shown in Figures 1 and 2. The rivets 46 of the link to be repaired are then knocked out and the links of the chain lying on either side of the removed link are moved forward on to the anvil by drawing the chain through the guide means 14. A new link is then united to the links adjacent the link which has been removed by riveting on the anvil with the rivet heads resting in the slot 31 on the anvil 12. The chain is then drawn through the guide members 14 and the operation repeated for any other links in need of replacement.

What I claim as my invention is:

1. A device for repairing a chain saw comprising in combination, a bedplate, a raised anvil element located on the upper surface of the bedplate near one end thereof, a sliding member adapted to slide on the upper surface of the bedplate longitudinally thereof towards and away from the anvil element, means to lock the sliding member in a desired position relative to the anvil element, a pair of longitudinally slotted chain guide means on the sliding member, and chain retaining means for engaging the chain and retaining it in position in said longitudinally slotted chain guide means whilst the device is in use.

2. A device for repairing a chain saw comprising in combination, a bedplate, a raised anvil element located on the upper surface of the bedplate near one end thereof, a sliding member adapted to slide on the upper surface of the bedplate longitudinally thereof towards and away from the anvil element, means to lock the sliding member in a desired position relative to the anvil element, a pair of longitudinally slotted chain guide elements on the sliding member, and extending rearwardly thereof one on either side away from the anvil element, and being substantially parallel to the longitudinal axis of the device and to the bedplate, the slots of said longitudinally slotted chain guide elements opening sidewardly and outwardly.

3. A device as claimed in claim 2, wherein the chain retaining means comprises a pair of upstanding shields extending longitudinally of the bedplate in spaced relationship thereto one on either side thereof.

4. A device as claimed in claim 2, wherein the chain retaining means comprises a spring steel member which spans the sliding member and guide means, and is provided with flanges which engage the chain saw under repair and exerts pressure inwardly thereon to retain the chain saw in position in the slots of said chain guide means.

5. A device as claimed in claim 2, wherein the chain retaining means comprises a pair of substantially L-shaped elements united at their webs to form a substantially U-shaped member, means on the web of the U-shaped member to adjust the distance between the flanges of the member to a desired value and means to lock the elements together when the required adjustment has been effected.

6. A device for repairing a chain saw comprising in combination, a bedplate, a raised anvil element located on the upper surface of the bedplate near one end thereof, a sliding member adapted to slide on the upper surface of the bedplate longitudinally thereof towards and away from the anvil element, means to limit the movement of the sliding member relative to the bedplate, means to lock the sliding member in one of a range of positions within the limits defined by the limiting means, longitudinally slotted chain guide means on the sliding member and extending rearwardly therefrom, and chain retaining means for engaging the chain and retaining it in position in the chain guides, whereby the chain under repair is retained in the desired position when the repairing device is utilized.

7. A device as claimed in claim 6, wherein the said locking means is a set bolt adapted to bring pressure to bear on the upper surface of the sliding member to lock the same relative to the base-plate.

8. A device as claimed in claim 6 wherein the means to limit the movement of the sliding member is a longitudinal slot through which the set-bolt extends into a vertical threaded hole, the end faces of the longitudinal slot abutting against the shank of the set-bolt whereby the movement of the sliding member is limited.

9. A device as claimed in claim 6 wherein means are provided for preventing lateral movement of the sliding member relative to the base-plate.

10. A device as claimed in claim 9 wherein the means for preventing the lateral movement of the sliding member comprises at least one slot in the upper surface of the base-plate extending longitudinally thereof and a projection beneath the under side of the sliding member, which projection depends downwardly into operative engagement with the said slot.

11. A device for repairing a chain saw comprising in combination a bedplate, a raised anvil element located on the upper surface of the bedplate near one end thereof, a sliding member adapted to slide on the upper surface of the bedplate longitudinally thereof towards and away from the anvil element, means to lock the sliding member in a desired position relative to the anvil element, a pair of longitudinally slotted chain guide elements attached to the upper surface of the sliding member and extending rearwardly one on either side thereof away from the anvil element, substantially parallel to the longitudinal axis of the device and to the bedplate, the slots of said longitudinally slotted chain guide elements opening sidewardly and outwardly.

12. A device for repairing a chain saw comprising in combination a bedplate, a raised anvil element located on the upper surface of the bedplate near one end thereof, a sliding member adapted to slide on the upper surface of the bedplate longitudinally thereof towards and away from the anvil element, means to lock the sliding member in a desired position relative to the anvil element, means for preventing lateral movement of the sliding member relative to the bedplate, a pair of longitudinally slotted chain guide elements on the sliding member, and extending rearwardly thereof one on either side away from the anvil element, and being substantially parallel to the longitudinal axis of the device and to the bedplate, the slots of said longitudinally slotted chain guide elements opening sidewardly and outwardly.

References Cited in the file of this patent

UNITED STATES PATENTS

| | | |
|---|---|---|
| 504,521 | Dillon | Sept. 5, 1893 |
| 611,713 | Skersick | Oct. 4, 1898 |
| 2,213,413 | Shaw | Sept. 3, 1940 |
| 2,293,231 | Weiland | Aug. 18, 1942 |